United States Patent [19]
Chiu

[11] Patent Number: 5,312,187
[45] Date of Patent: May 17, 1994

[54] SAFETY PIN WITH ATTACHED MULTI-FUNCTION THERMOMETER

[76] Inventor: Kuen-Hwang Chiu, No. 4, Lane 27, Sec. 6, Foo-An Road, Tainan, Taiwan

[21] Appl. No.: 20,830

[22] Filed: Feb. 22, 1993

[51] Int. Cl.$^5$ .................. G01K 1/16; G01K 13/00
[52] U.S. Cl. .................. 374/151; 128/736; 374/165; 374/150
[58] Field of Search .......... 374/151, 161, 165, 150; 128/736

[56] References Cited

U.S. PATENT DOCUMENTS

| | | | |
|---|---|---|---|
| 2,981,108 | 4/1961 | Andersen et al. | 374/150 |
| 3,274,994 | 9/1966 | Sturm | 128/736 |
| 3,884,219 | 5/1975 | Richardson et al. | 128/736 X |
| 4,747,413 | 5/1988 | Block | 128/736 |
| 4,779,995 | 10/1988 | Santacaterina et al. | 374/161 X |

FOREIGN PATENT DOCUMENTS

| | | | |
|---|---|---|---|
| 0039434 | 4/1981 | Japan | 374/151 |
| 227569 | 1/1924 | United Kingdom | 374/151 |

*Primary Examiner*—Daniel M. Yasich
*Attorney, Agent, or Firm*—Nikaido, Marmelstein, Murray & Oram

[57] ABSTRACT

The invention herein relates to a kind of safety pin with an attached multi-function thermometer which consists mainly of a temperature display and pulse tone emitting integrated circuit board. The enclosure of the aforesaid integrated circuit board can be fabricated in the shape of various animals or cartoon characters. A safety pin is mounted on the rear side of the enclosure for fastening the device onto the clothing of an infant. Extending from the integrated circuit board is a coiled conductor connected to a threaded seat that is fastened in screw-on fashion to a heat sensor rod contained in a pacifier nipple. As an infant sucks the pacifier nipple, the oral temperature of the infant is measured by the heat sensor rod and the temperature reading is shown via a liquid crystal display on the integrated circuit board. The integrated circuit board also has specially designed temperature setting functions. When the measured temperature exceeds the set temperature, a pulsing tone is produced to indicate that the temperature of the infant is abnormal. Other important objectives include the possibility of connecting the coiled conductor to a thermometer or ear piece to enable temperature reading at a larger number of points on the body, while widening the scope of applications, increasing the multi-function range and raising the added-value of this product—a key secondary objective of the invention herein.

14 Claims, 5 Drawing Sheets

SAFETY PIN WITH ATTACHED MULTI-FUNCTION THERMOMETER

BACKGROUND OF THE INVENTION

In addition to excellent quality, reasonable price and other related factors, perhaps the most important factor that determines the commercial success of a marketed product is whether the product is practical and has the added-value capacity instrumental to the continual raising of its product competitiveness. When certain products are introduced, since their new application competitiveness relative to other products in the same category is often minimal and therefore are incapable of attaining a leading position in the market, as the number of products in a given category increases, if the product itself is not improved, its competitiveness is lost and the product may even be eliminated from the market.

In reference to the aforementioned situation, the pacifier nipple is a good example. When pacifier nipple were first introduced in the market, nearly all of them lacked major changes in form. After a certain period of time, the number of manufacturers and marketers increased. In order to widen sales capabilities in the market, many kinds of different animals and illustrations were adapted as modifications, with drawing and other cosmetic embellishment designed to stimulate consumer purchases and selection. However, this sort of passive solution could not raise market competitiveness and the main reason was that the pacifier nipple still had only one function, that of being a pacifier nipple. Thus, without the offering of additional applications, the products lost its competitiveness.

With further regard to the inability to integrate additional product functions to pacifier nipples, the inventor herein has thought of improvements, initially thinking that besides the essential function of pacifier nipples to comfort an infant by providing a means of oral gratification, temperature measuring and mesmerizing sound functions could be included and thus attain a degree of multi-function-based added value which could strengthen competitiveness in the pacifier nipple market.

Based on this innovative concept, the inventor herein has continuously devoted serious effort in research and development, an undertaking that involved constant improvements in design before finally completing the prototype product of the invention herein.

DESCRIPTION OF THE PREFERRED EMBODIMENTS

In order to respectfully provide inspection officials with a thorough understanding of the invention herein, detailed drawings and descriptions are appended to fully explain the installation, structural characteristics, practical applications and objectives.

Figure 1:
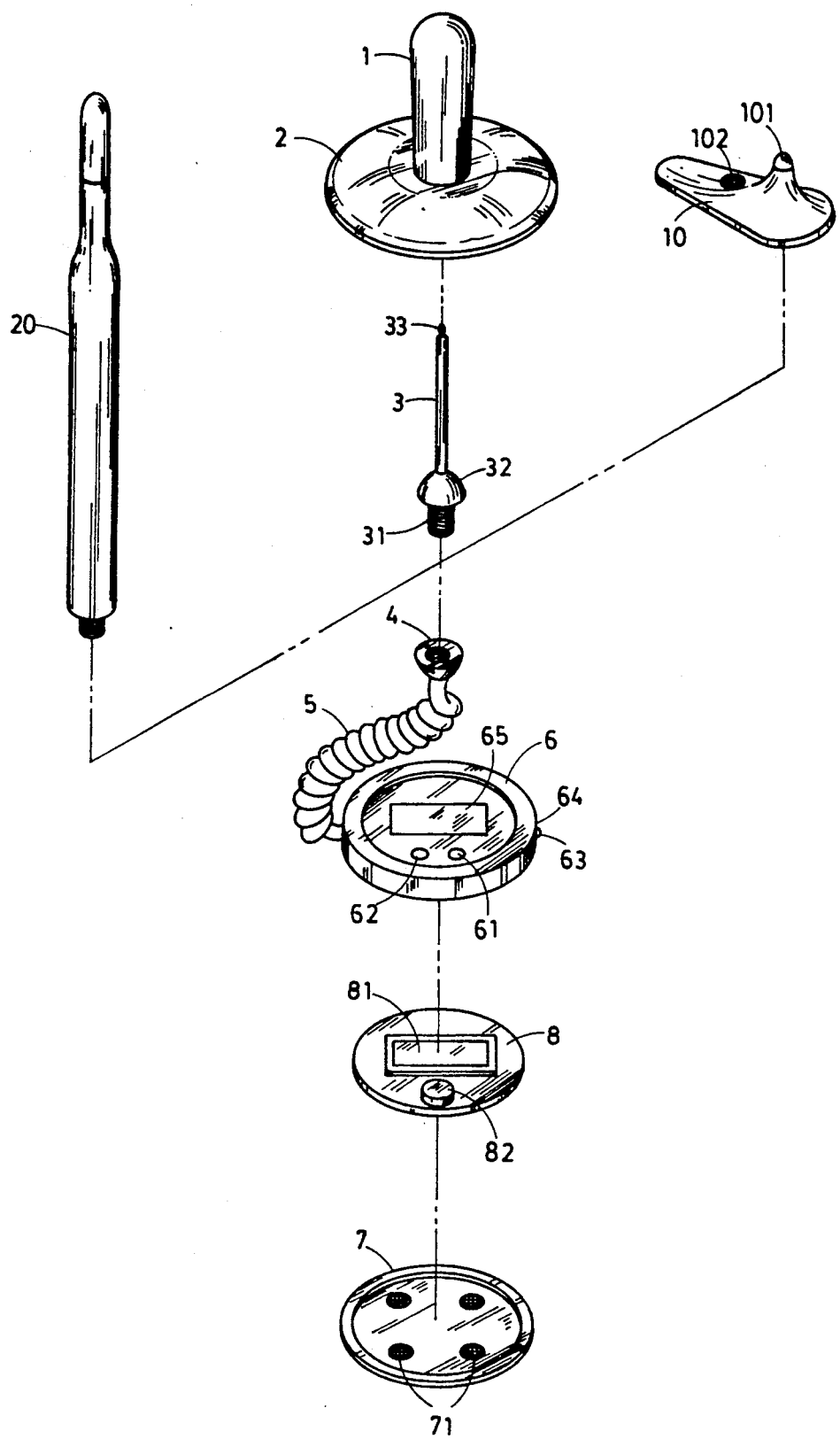
FIG. 1 is an exploded drawing of the invention showing three separate thermoelectric members.
Figure 2:
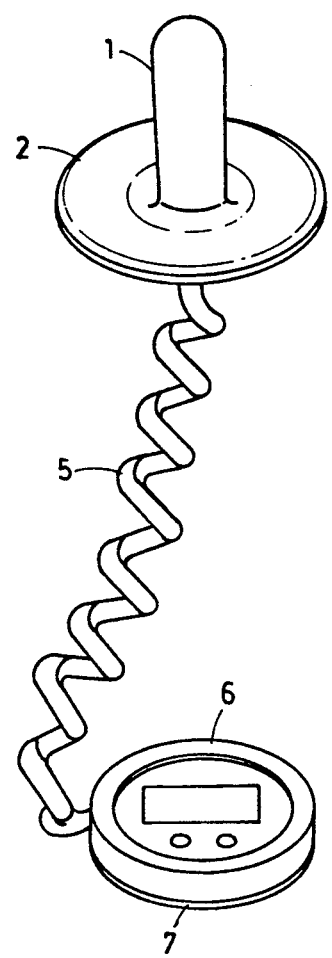
FIG. 2 is a drawing of the assembled invention herein.
Figure 3:
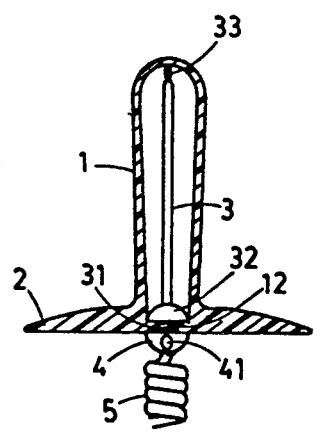
FIG. 3 is a cross-sectional drawing showing a portion of the base plate of the invention herein.

As indicated in FIG. 1 and FIG. 2, the overall physical structure of the invention herein includes:

A hollow nipple (1) constructed of a soft non-toxic silicon rubber, with the lower portion formed into a contiguous base section (2) and on the underside of the base section (2) is a centered through-hole (12), as indicated in FIG. 3; when an infant sucks the aforesaid nipple for one hour, the base section (2) lowers towards the infant nipple; the nipple (1) and the base section (2) are both made of non-toxic silicon rubber and are can be safely placed into the mouth and sucked.

Slipped onto and positioned at the lower end of the heat sensor rod (3) is a threaded collar (31) and a retaining plate (32), respectively; furthermore, the heat sensor rod (3) can be inserted upward and downward into the centered through-hole (12) leading to the inside of the nipple (1), while the upper tip (33) of the heat sensor rod (3) is positioned within the nipple (1) to measure the temperature at the external surface of the nipple (1); the threaded collar (31) protrudes from the underside of the through-hole (12) and the retaining plate (32) is positioned on the lower interior surface of the nipple (1).

A threaded seat (4) that is convex in shape has a coiled conductor (5) connected to its base; the threaded seat (4) is fastened firmly onto a threaded collar (31) such that the threaded seat (4) is tightened flush against the underside of the aforementioned base section (2) and, in conjunction with the aforementioned retaining plate (32), is well secured to the nipple (1) to prevent it from dropping off and, as indicated in FIG. 3, there are two slots (41) on the exterior of the threaded seat (4) to facilitate easy fastening and removal by hand.

An upper cover (6) and a base plate (7) that in combination accommodate the installation and enclosing of the integrated circuit board (8), and there is an appropriately placed opening in the upper cover (6) for the insertion of the aforementioned coiled conductor (5) through the upper cover (6) and down to the integrated circuit board (8); the upper cover (6) has a transparent bezel (65) and, furthermore, the upper cover (6) also has individual holes leading to the integrated circuit board (8) for an on-off push button switch (61), a temperature setting push button switch (62), a panel light push button switch (63) and a temperature unit conversion selector push button switch (64); the aforementioned coiled conductor (5) is protected by an external layer of insulation and, to further increase the margin of safety during infant usage, the coiled conductor (5) is of limited length, in other words, the maximum extended length cannot wrap around the throat of an infant, thus enhancing overall safety by eliminating concern related to hazards due to the coiled conductor (5).

Figure 4:
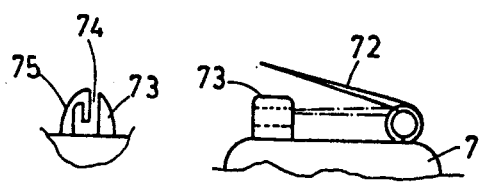
FIG. 4 is an orthographic drawing showing a portion of the base plate of the invention herein.
Figure 5:
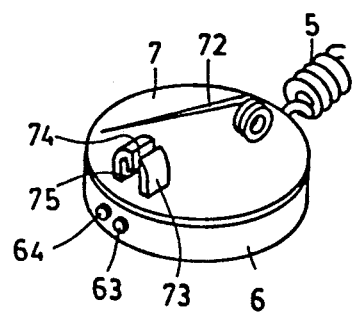
FIG. 5 is an isometric drawing of the base plate of the invention herein.

A liquid crystal display (81) and battery (82) connected to the aforementioned integrated circuit board (8); the battery (82) supplies electrical power to the integrated circuit board (8) and enables the integrated circuit board (8) to transfer signals to the liquid crystal display (81), and the liquid crystal display (81) screens numbers, symbols and light through the aforementioned transparent bezel (65) and, furthermore, the integrated circuit board (8) can be configured to output tone pulses or music when triggered by the appropriate signals; positioned inside the aforementioned base plate (7) along with the integrated circuit board (8) is a speaker (71) in an arrangement that enables the aforesaid tone pulses or music produced by the integrated circuit board (8) to be emitted by the speaker (71) and, furthermore, mounted on the underside of the base plate (7) is a spring-loaded safety pin (72) and a protruding clasp (73); the clasp (73) has an internally formed winding yet contiguous channel consisting of an entry-exit slot (74) and a securing slot (75) and, as indicated in FIG. 4 and FIG. 5, the spring-loaded safety pin (72) can be pierced through the clothing of an infant and then pushed into the entry-exit slot (74) before being guided into the securing slot (75) to achieve the objective of fastening on the clothing of an infant.

Figure 6:
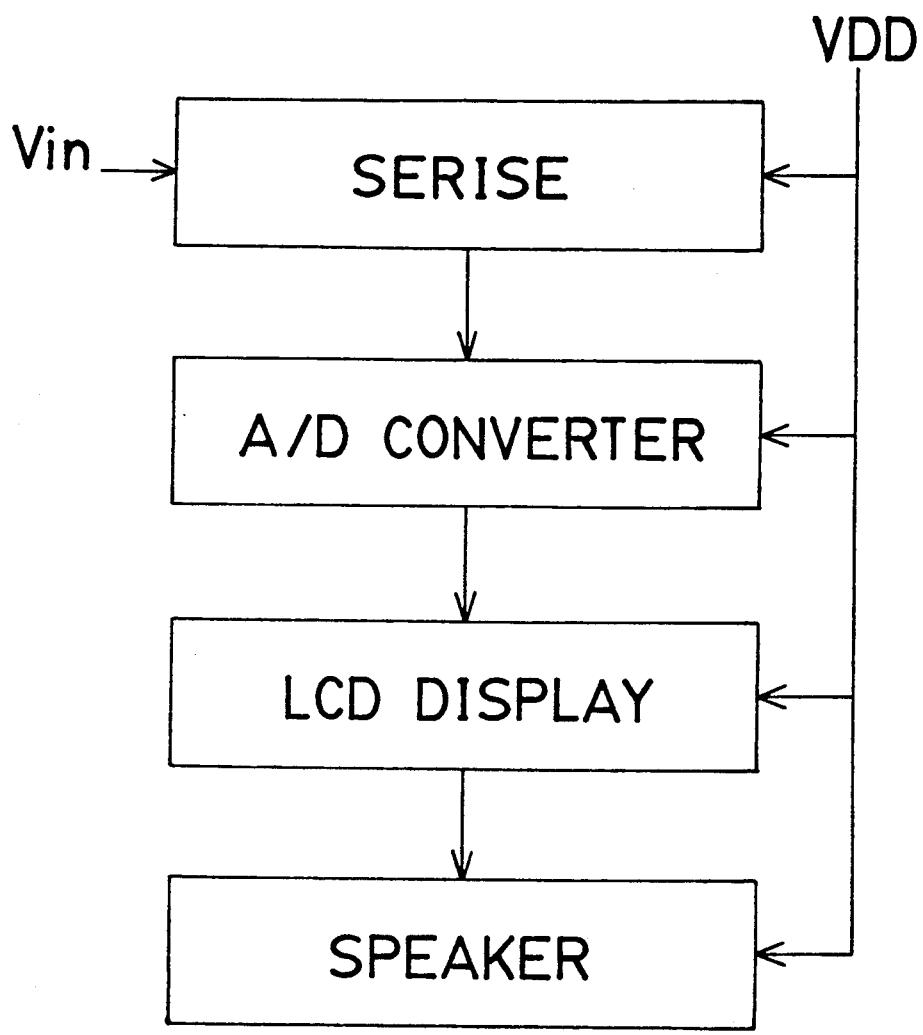
FIG. 6 is a block diagram of the circuit of the invention herein.

Regarding the block diagram of the electronic circuit relating to the aforementioned integrated circuit board (8) of the invention herein, as indicated in FIG. 6, the main sections include the sensor circuit, the analog-to-digital conversion circuit, the liquid crystal display circuit and the audio circuit. With the aforesaid circuits interconnected in the configuration depicted, the following procedures are applicable to the actual operation of the invention herein:

1. After pressing the aforementioned on-off push button switch (61) the first time to start the supplying of electrical power to the integrated circuit board (8), the user may proceed with the operations for setting the temperature, the desired temperature conversion, the liquid crystal display, the panel light intensity and the mode for pulse tone or music output; if temperature readings are not taken for a period exceeding ten minutes, then the invention herein automatically switches off the supply of electrical power to avoid wasting electricity.

2. By pressing the on-off push button switch (61) a second time, the integrated circuit board (8) is initialized to output music through the aforementioned speaker (71), a mesmerizing effect which will help an infant fall asleep.

3. While the infant is sucking the aforementioned nipple (1), the temperature inside the oral cavity of the infant is measured by the upper tip (33) of the aforementioned heat sensor rod (3) and is directed through the aforementioned coiled conductor (5) to the integrated circuit board (8); the oral cavity temperature reading of the infant is then shown by the liquid crystal display (81) and is viewed through the aforementioned transparent bezel (65); if the measured temperature exceeds that preset by pressing the aforementioned temperature setting push button switch (62), then the speaker (71) will emit pulsed tones and the red indicator light on the liquid crystal display (81) will flash to alert adults that of the temperature of the infant has changed.

4. By pressing the aforementioned temperature unit conversion push button switch (64), the integrated circuit board (8) becomes receptive to the input of signals governing the selection of temperature readings at the liquid crystal display (81) in units of Celsius or Fahrenheit, thus affording greater practicality in operation.

5. When taking temperature readings at night, press the aforementioned panel light push button switch (63) to enable the integrated circuit board (8) to receive signals that toggles the illumination of the numbers and symbols shown by the liquid crystal display (81).

6. After the aforementioned threaded seat (4) is unfastened from the aforementioned threaded collar (31), the heat sensor rod (3) can be pulled out and removed from the nipple (1) so that the nipple may be cleaned and sterilized in boiling water; thorough disinfection ensures that such objects entering the mouth of an infant are sanitary.

7. To utilize the specially designed safety pin of the invention herein, pierce the aforementioned spring-loaded safety pin (72) mounted on the underside of the aforementioned base plate (7) through the clothing of the infant and then slide the tip into the aforementioned securing slot (75); pinning the invention herein on the infant is convenient and usage prevents the nipple from falling off and becoming dirty or lost on the floor.

Figure 7:
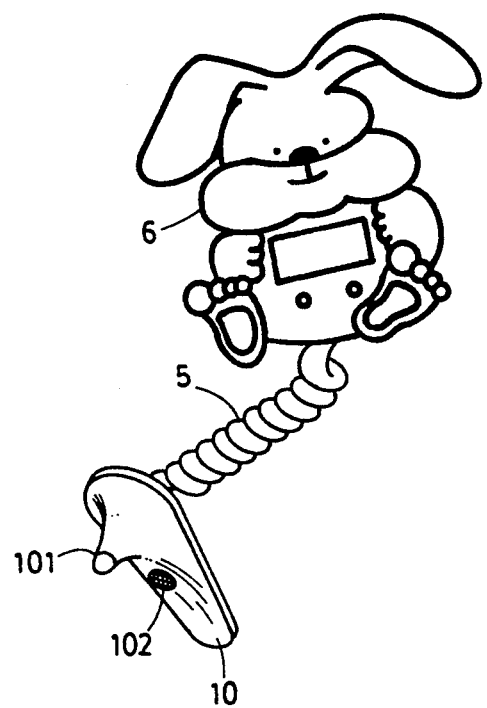
FIG. 7 is a drawing of the ear piece which integrates and comprises an example alternate configuration of the invention herein.

In addition to a pacifier nipple, the invention herein can be configured in two other forms:

A. As indicated in FIG. 7, the aforementioned threaded seat (4) can also be fastened to a section of an ear piece (10) and on the opposite side of the ear piece (10) is an insertion cone (101) with an internally mounted heat sensor (not shown in the diagram); also on the same side of the ear piece (10) is a speaker (102); the insertion cone (101) is placed into the ear of an infant and the temperature reading taken in the ear is transferred through the aforementioned coiled conductor (5) to the aforementioned integrated circuit board (8), with the temperature figures then shown by the aforementioned liquid crystal display (81) and viewed through the aforementioned transparent bezel (65), thus resulting in a convenient method of measuring the ear temperature of an infant; furthermore, the music outputted by the integrated circuit board (8) is sent through the coiled conductor (5) to the speaker which reproduces soothing music with a highly mesmerizing effectiveness.

Figure 8:
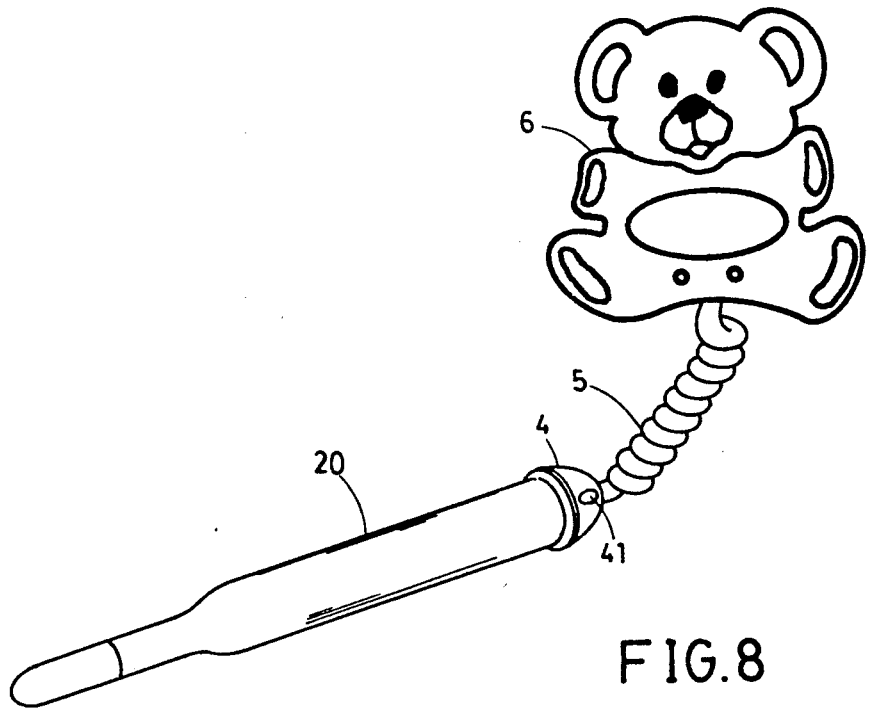
FIG. 8 is a drawing of the thermometer which integrates and comprises an example alternate configuration of the invention herein.

B. As indicated in FIG. 8, the aforementioned threaded seat (4) can also be fastened to the end of a thermometer (20) and installed inside the thermometer (20) is heat sensor that enables the thermometer (20) to measure the temperature of the human body, the readings of which are sent through the aforementioned coiled conductor (5) to the aforementioned integrated circuit board (8) and then shown by the aforementioned liquid crystal display (81) through the aforementioned transparent bezel (65), thus providing a method of knowing the precise temperature in numerical representation at any part whatsoever of the human body.

Moreover, the aforementioned upper cover (6) and the aforementioned base plate (7) containing the aforementioned integrated circuit board (8) of the invention herein can fabricated in the shape of various animals and cartoon characters because the upper cover (6) and the base plate (7) merely serve as enclosures and in themselves have no other function; therefore, any variations in shape will not affect the normal operation of the invention herein, but may actually increase its value in terms of yielding a more attractive appearance and, furthermore, compared to conventional safety pins connected by a cord to an infant pacifier nipple, the invention herein offers more functions, types of usage and improvements by adding electronically controlled capabilities into the base plate of the safety pin as well as a functional conductor cord connected to the pacifier nipple, thus constituting a virtual re-invention of the conventional product with a higher added-value that is believed to have a wider potential demand in the market.

In summation of the aforementioned description, the invention herein is capable of integrating a wide range of practical functions in pacifier nipples and, besides offering additional pacifier nipple functions, can effectively raise the product value of pacifier nipples and thus may be termed an unusually excellent product innovation. In application for the patent rights of the invention herein, it is respectfully requested that the examining officials carefully refer to the following drawings as a basis of approval.

What is claimed is:

1. A multi-function thermometer, of which the main components comprise: a hollow thermoelectric member with a base wherein the base has a through-hole, a heat sensor rod with a heat sensor tip at the upper end as well as a threaded collar and retaining plate, respectively, onto the lower end, and the heat sensor rod is inserted into the through-hole in the thermoelectric member base section, with the threaded collar secured against the underside of the through-hole and the retaining plate secured against the lower interior surface of the thermoelectric member; a threaded seat that is convex in shape and connected via a coiled conductor to the threaded collar and, the threaded seat is fastened against the underside of the thermoelectric member base section; an upper cover and a base plate that both enclose an integrated circuit board, and the upper cover has an appropriately placed opening for the insert of the coiled conductor through the upper cover and down to the integrated circuit board, and the upper cover also has a transparent bezel which is aligned with a liquid crystal display that is on the integrated circuit board, and the temperature read by the heat sensor tip is transferred through the coiled conductor and the integrated circuit board to the liquid crystal display, the temperature in numerical representation is viewed through the transparent bezel, furthermore, the integrated circuit board is also capable of processing a range of different electronic signals which are transferred to the liquid crystal display and shown or transferred through the coiled conductor and outputted, mounted on the underside of the base plate is a spring-loaded safety pin and a protruding clasp, and the clasp has an internally formed winding yet contiguous channel consisting of an entry-exit slot and a securing slot which permits the tip of the spring-loaded safety pin to be pushed into the entry-exit slot and guided into the securing slot after being pierced through the clothing of an infant.

2. A multi-function thermometer as described in claim 1 wherein, the thermo-electric. Types of the said member comprises a nipple.

3. A multi-function thermometer as in claim 1 wherein, the threaded seat has two slots on the exterior that facilitate easy fastening and removal by hand.

4. A multi-function thermometer as in claim 1 wherein, the threaded seat can also be fastened to an ear piece or a thermometer to measure temperature in the ear or at any point whatsoever on the human body, respectively.

5. A multi-function thermometer as in claim 1 wherein, the upper cover and the base plate can be fabricated into the shape of various animals and cartoon characters.

6. A multi-function thermometer as in claim 1 wherein, the thermoelectric member comprises an ear piece.

7. A multi-function thermometer as in claim 1 wherein, the thermoelectric member comprises a thermometer.

8. A multi-function thermometer as in claim 6, the nipple is made from non-toxic silicon rubber.

9. A multi-function thermometer comprising
a hollow thermoelectric member with a base wherein said base has a through-hole;
a heat sensor rod with a first and second end, said first end comprising a heat sensor tip and said second end comprising retaining plate and connecting member;
wherein said heat sensor rod is disposed in said hollow thermoelectric member, said second end being disposed adjacent to said base;
a first and second cover;
an integrated circuit disposed between said first and second covers; and
a conducting member connected to said connecting member and said integrated circuit.

10. A multi-function thermometer as in claim 9, wherein said conductor comprises a coiled conductor.

11. A multi-function thermometer as in claim 9, wherein said connecting member comprises a threaded collar.

12. A multi-function thermometer as in claim 9, further comprising a fastening mechanism disposed on said first cover for fastening said cover to a piece of fabric.

13. A multi-function thermometer as in claim 9, wherein said second cover comprises a transparent bezel.

14. A multi-function thermometer as in claim 9, wherein said integrated circuit comprises a liquid crystal display.

* * * * *